United States Patent [19]
Baumgaertner et al.

[11] Patent Number: 5,544,197
[45] Date of Patent: Aug. 6, 1996

[54] CUTOVER APPARATUS AND METHODS FOR SWITCHING A SIGNAL BETWEEN TWO TRANSMISSION MEDIA

[75] Inventors: Carl J. Baumgaertner, Glendora, Calif.; Robert M. McKaughan, Redmond, Wash.

[73] Assignee: Harvey Mudd College, Claremont, Calif.

[21] Appl. No.: 224,048

[22] Filed: Apr. 7, 1994

[51] Int. Cl.[6] .................................................. H01P 5/00
[52] U.S. Cl. .............................. 375/257; 375/260; 333/3; 340/825.01
[58] Field of Search .................................... 357/257, 260; 333/3; 340/825.01, 825.03; 371/8.2; 370/16

[56] References Cited

U.S. PATENT DOCUMENTS

| | | | |
|---|---|---|---|
| 4,365,247 | 12/1982 | Bargeton et al. | 340/825.01 |
| 4,630,284 | 12/1986 | Cooperman | 375/257 |
| 4,633,473 | 12/1986 | Ratchford et al. | 357/257 |
| 5,274,671 | 12/1993 | Johnson | 375/257 |

OTHER PUBLICATIONS

Throwmaster® 109, Special Circuit Transfer Set, Brochure by *Industrial Technology* ©1992, 1993.

Primary Examiner—Stephen Chin
Assistant Examiner—Timothy J. May
Attorney, Agent, or Firm—Christie, Parker & Hale, LLP

[57] ABSTRACT

A system and methods are provided for switching a signal from a first transmission media having a characteristic impedance to a second transmission media. The system includes a driver for driving a signal, the driver having a driver input having a high impedance relative to a characteristic impedance of the first transmission media and the driver having a driver output having an impedance equal to the characteristic impedance of the first transmission media. A first switch couples the driver output either to the first transmission media or to the second transmission media and couples a signal from the first transmission media, which is coupled to the driver input, either to the first transmission media or to the second transmission media. A first switch controller controls the first switch to either simultaneously couple the driver output to the first transmission media and the signal from the first transmission media coupled to the driver input to the second transmission media or simultaneously coupling the driver output to the second transmission media and the signal from the first transmission media coupled to the driver input to the first transmission media. A terminator having an impedance equal to the characteristic impedance of the first transmission media for terminating a signal from either the first or the second transmission media is switched by a second switch to terminate either the first or second transmission media.

29 Claims, 11 Drawing Sheets

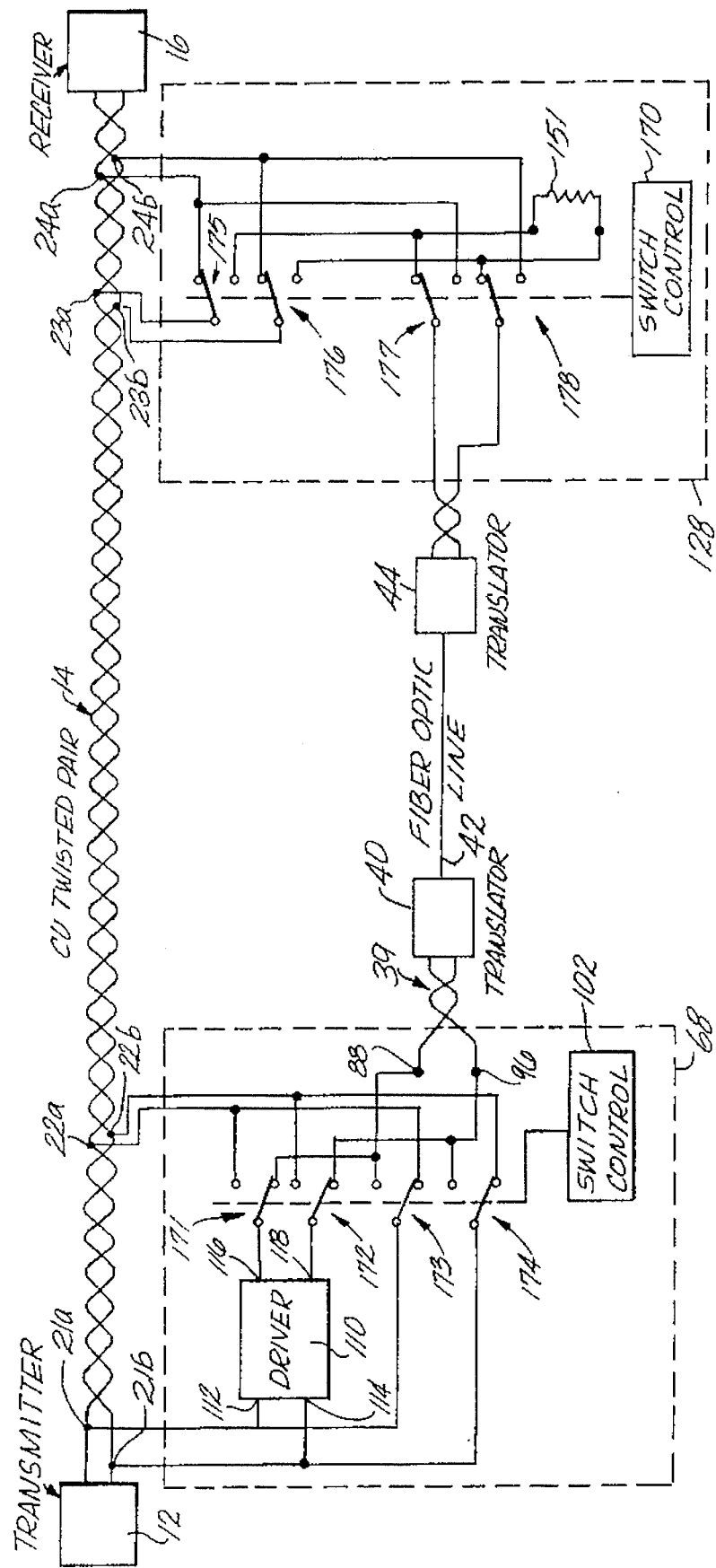

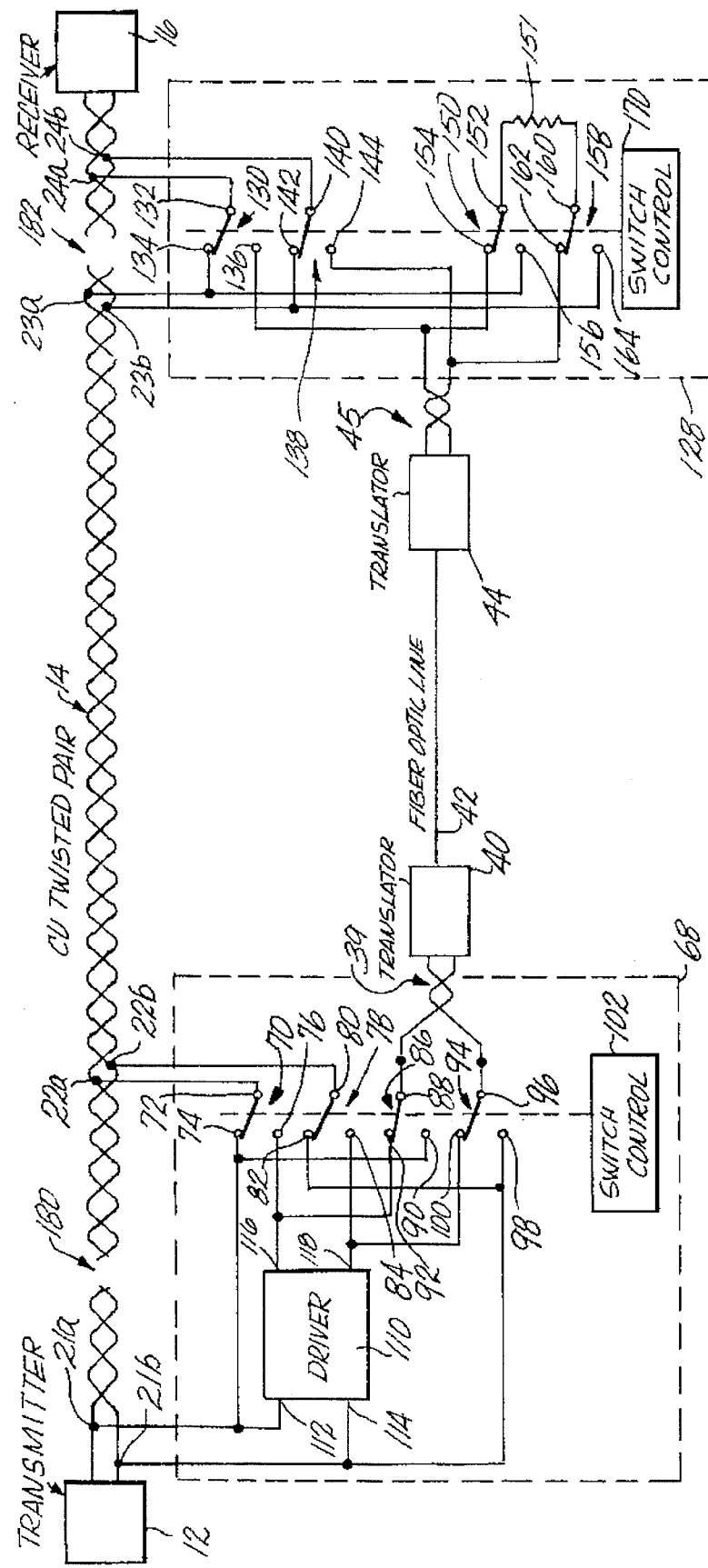

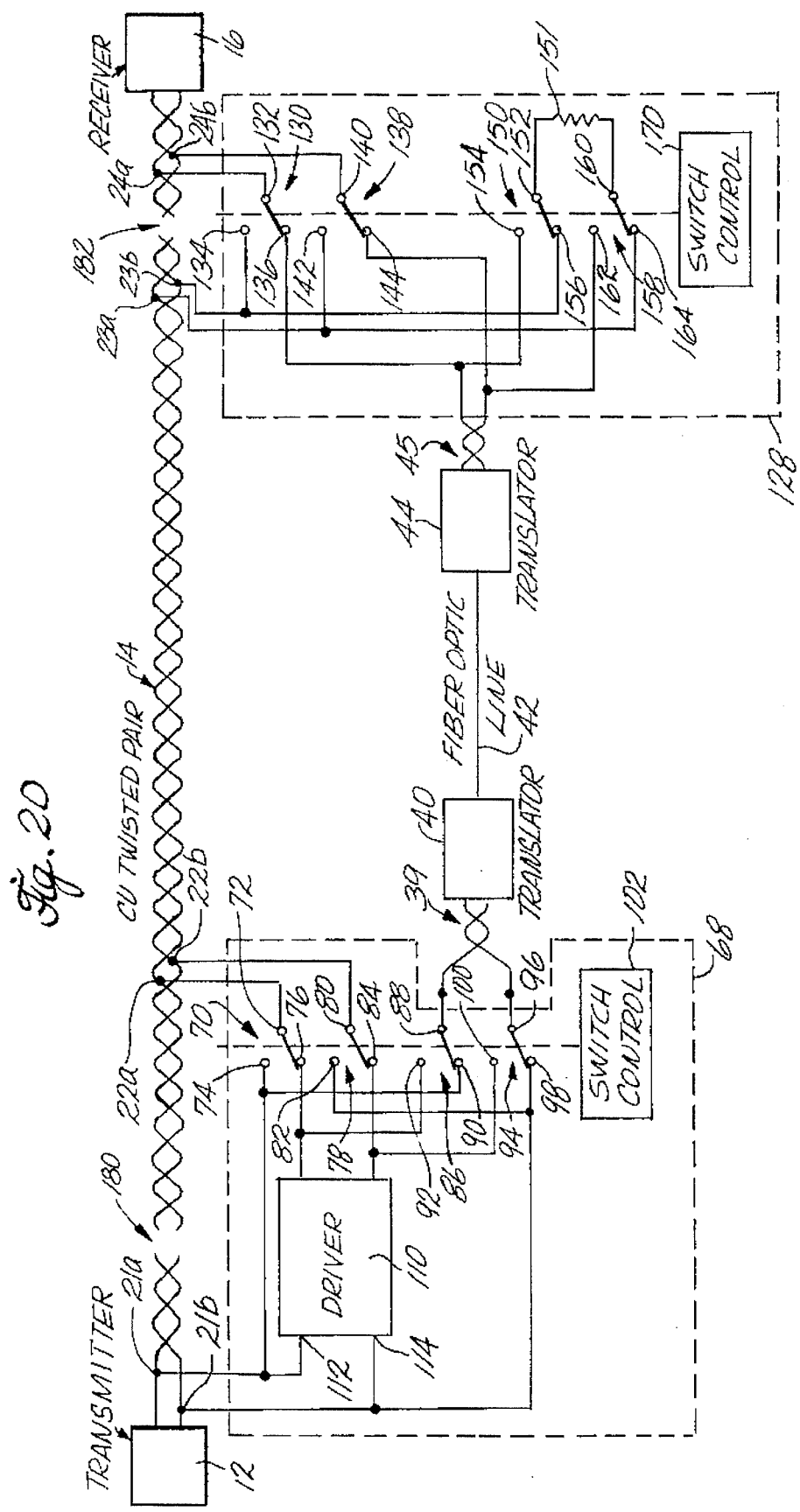

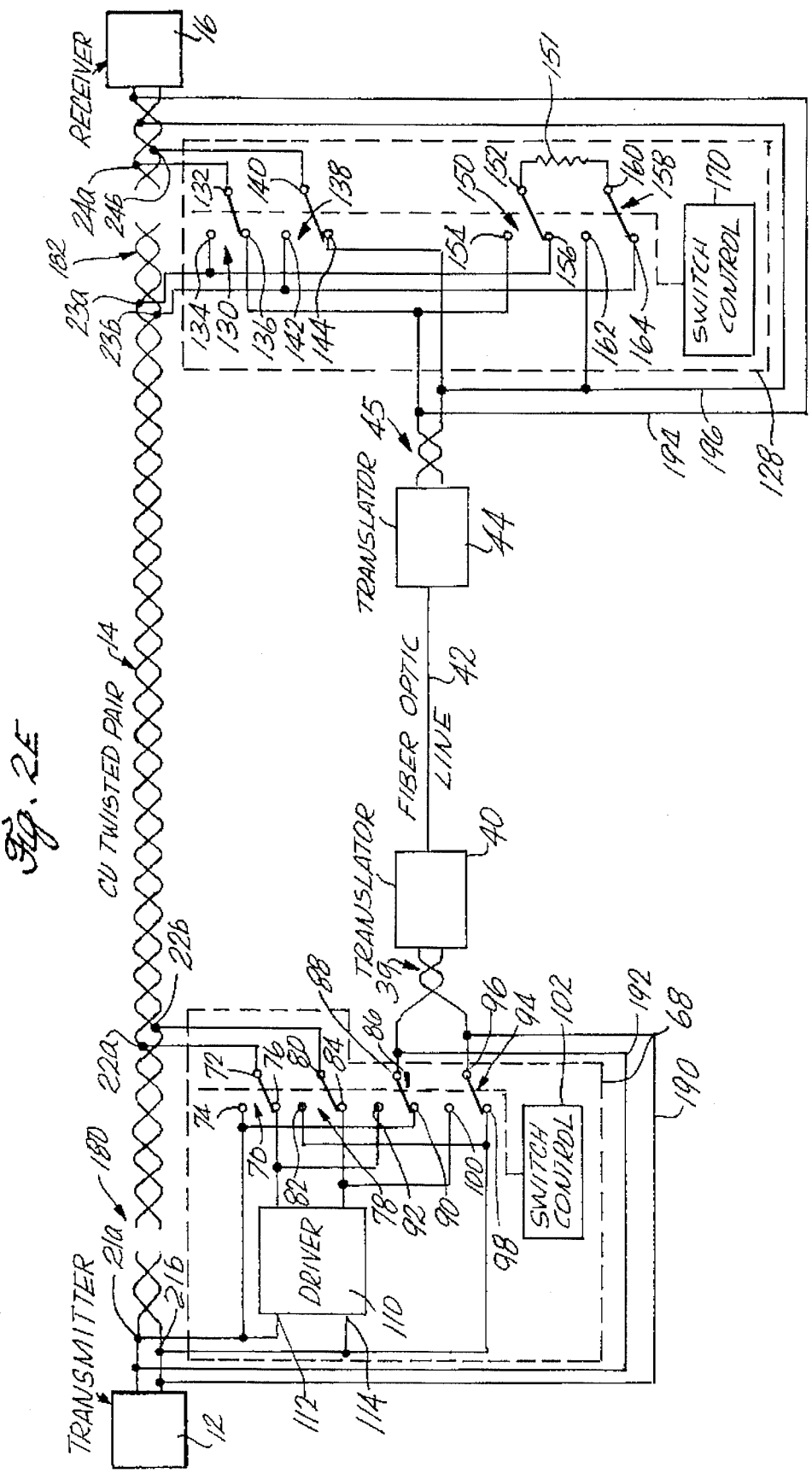

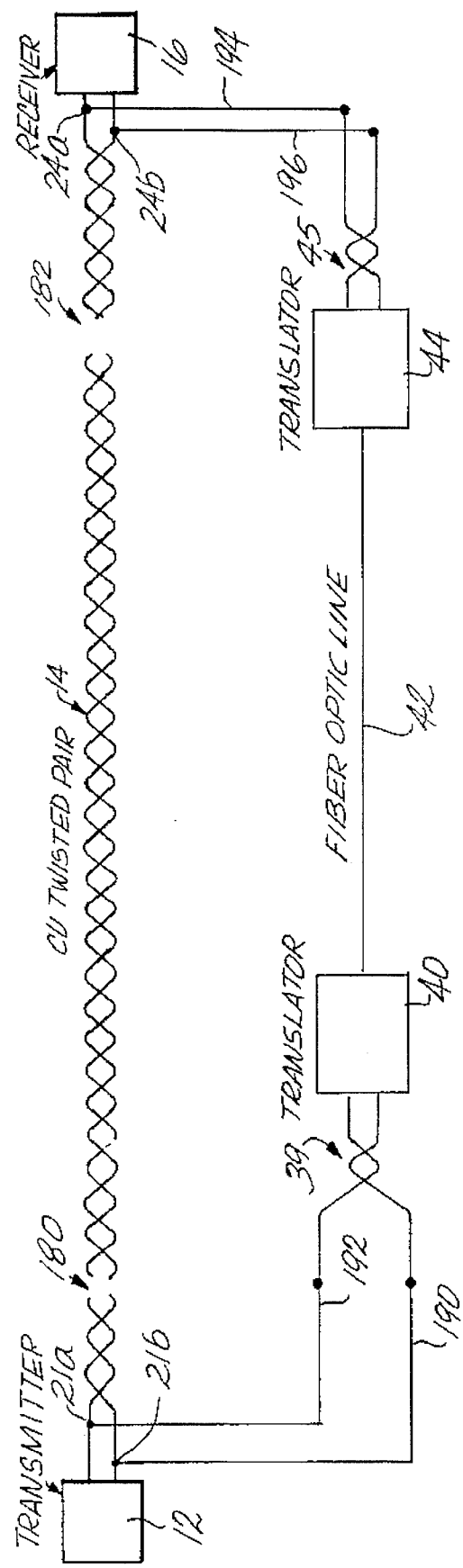

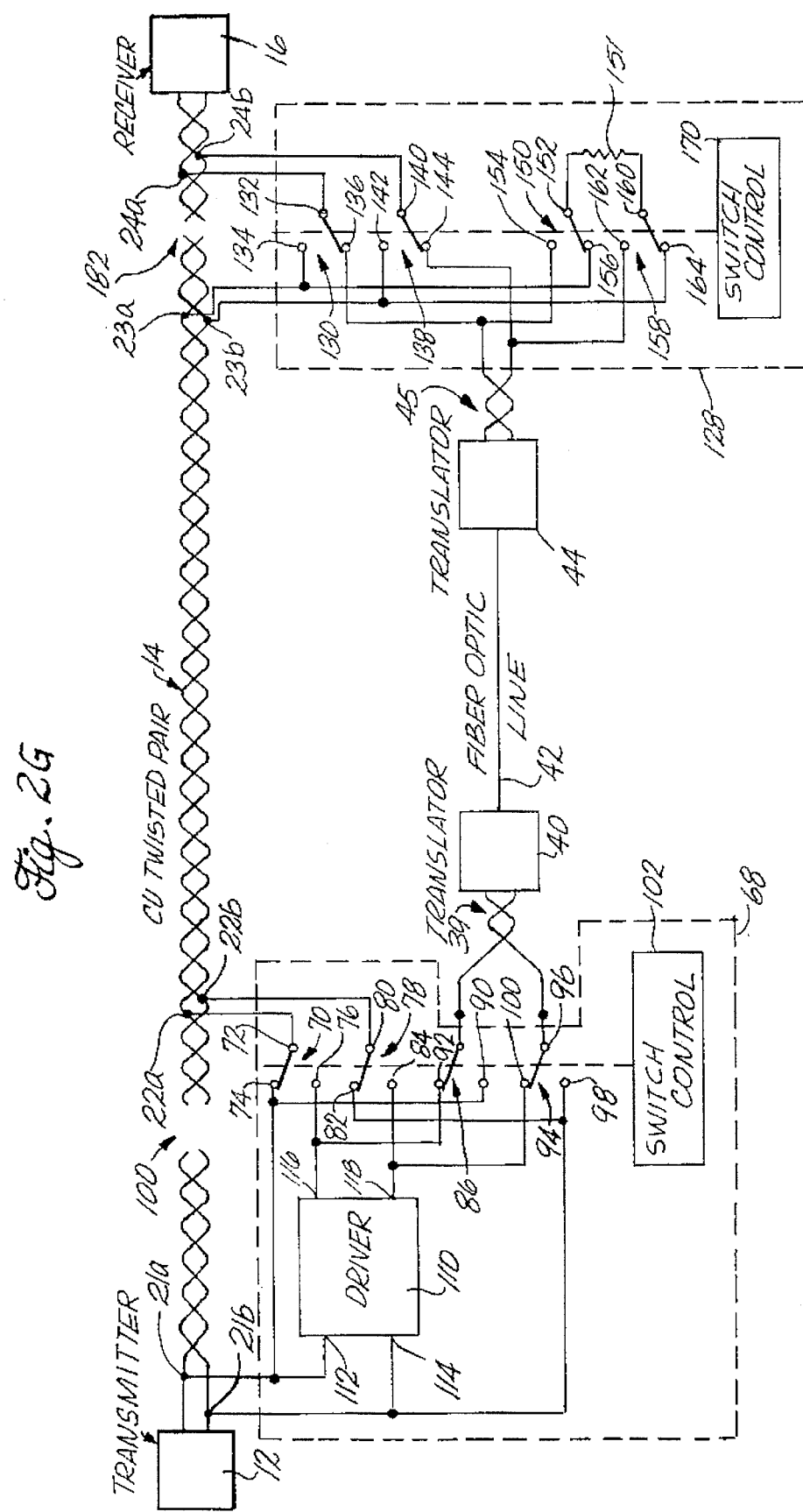

CUTOVER APPARATUS AND METHODS FOR SWITCHING A SIGNAL BETWEEN TWO TRANSMISSION MEDIA

BACKGROUND OF THE INVENTION

1. Field of the Invention

This invention relates to digital transmission systems and particularly to cutover apparatus and methods for switching from one transmission media to a second transmission media.

2. Description of the Related Art

Currently telephone companies provide their customers with a digital point-to-point carrier services that can transmit up to 1.544 million bits per second. The existing digital point-to-point carrier services use copper twisted pair wiring which was designed to carry voice grade communications with frequencies of 300 hz to 3 khz, rather than the high frequencies of digital signals which range between 56 kilobits per second to 45 megabytes per second. With the decreasing cost and the increased reliability of fiber optic communication systems, telephone companies are upgrading customers to fiber optic lines. Using a light signal rather than an electrical signal, fiber optic systems are not subject to signal degradation caused by external electromagnetic fields. New fiber optic systems also incorporate backup systems built to automatically handle line failures. Since customers find these features desirable, telephone companies are upgrading their customers to fiber optic systems in order to stay competitive in the digital services market.

Unfortunately, to make an upgrade from copper twisted pair wiring to fiber optic lines, the telephone company must schedule a service outage with the customer. Many of these customers have come to rely on their digital communications for business. A super-computing center or a bank can lose a significant amount of time and money while their service is down. As a result, obtaining a release for down time is very difficult. If the telephone company does manage to schedule down time, the customer usually requires that the down time occur during off hours, thus, forcing the telephone company to pay its workers overtime to perform the upgrade. Also, fiber lines can serve 28 customers, so the telephone company would have to schedule the upgrade for all 28 customers.

Switching is also necessary to upgrade from other transmission media such as microwave to laser or other media. Similar upgrade scheduling problems occur for these other media.

It is desirable to eliminate these problems while finding a method to upgrade the customer from one media to another without causing any down time. This would allow telephone companies to build the new fiber optic service and then during regular hours switch to the new service without interruption to the customer. Further, it is desirable to make the switch as rapidly as possible so that the customer's receiver will not detect a change from one media to another.

Another requirement is to maintain signal quality. All transmission lines have a unique characteristic impedance. This property is a function of the geometry of the transmission wires used. If a transmission line has a resistive load at each end equal to the characteristic impedance of the line, a signal transversing the transmission line will be completely absorbed when it reaches the end of the line. If the transmission line is not terminated by its characteristic impedance the signal will not be completely absorbed at the end and will reflect back to the source. The reflection will interfere with and degrade the signal being transmitted. Thus, it is necessary to have a method of switching from one transmission media to another transmission media while maintaining the proper resistive load at each end of the transmission media equal to the characteristic impedance of the transmission media.

Accordingly, there is a need in the art for apparatus and methods for switching from one transmission media to a second transmission media.

SUMMARY OF THE INVENTION

In the present invention, a system and methods are provided for switching a signal from a first transmission media having a characteristic impedance to a second transmission media.

According to the invention, the system includes a driver having an input impedance that is high relative to the characteristic impedance of the first transmission media. The driver output has an impedance equal to the characteristic impedance of the first transmission media. A first switch is provided for coupling the driver output either to the first transmission media or to the second transmission media. The first switch also couples the signal from the first transmission media, which is coupled to the driver input, either to the first transmission media or to the second transmission media. A first switch control is provided for controlling the first switch for either simultaneously coupling the driver output to the first transmission media and the signal from the first transmission media on the driver input to the second transmission media or simultaneously coupling the river output to the second transmission media and the signal from the first transmission media on the driver input to the first transmission media.

The system further includes a second switch for coupling either the first transmission media or the second transmission media to a termination, and a second switch control for controlling the second switch.

A method is also provided for switching a signal from a first transmission media having a characteristic impedance to a second transmission media. The method includes the step of coupling a driver input to a first position on the first transmission media, the driver input on a driver for driving a signal and the driver input having a high impedance relative to the characteristic impedance of the first transmission media and the driver having a driver output having an impedance equal to the characteristic impedance of the first transmission media. The method includes the steps of coupling a first switch to the first position on the first transmission media, to the driver output, to a second position on the first transmission, and to the second transmission media for coupling the driver output either to the second position on the first transmission media or to the second transmission media and for coupling the signal from the first position on the first transmission media either to the second position on the first transmission media or to the second transmission media, and the step of controlling the first switch to couple the signal from the first position on the first transmission media to the second position on the first transmission media and to couple the driver output to the second transmission media.

BRIEF DESCRIPTION OF THE DRAWINGS

The features of specific embodiments of the best mode contemplated of carrying out the invention are illustrated in the drawings, in which:

FIG. 2A' is a block diagram of a digital carrier service with a partially installed cutover system similar to FIG. 2A, but having a different switch configuration according to the present invention.

FIG. 2B is a block diagram showing an installed cutover system connecting the transmitter and the receiver via the copper twisted pair with a portion of the copper twisted pair having been cut according to the present invention.

FIG. 2D is a block diagram showing an installed cutover system connecting the transmitter and the receiver via the fiber optic line according to the present invention.

FIG. 2E is a block diagram showing an installed cutover system connecting the transmitter and the receiver via the fiber optic line and cutover system bypass lines installed according to the present invention.

FIG. 2F is a block diagram showing the transmitter and the receiver connected via the fiber optic line and the bypass lines with the cutover system removed according to the present invention.

FIG. 2G is a block diagram showing an installed cutover system connecting the transmitter and the receiver via the driver and the fiber optic line according to the present invention.

DETAILED DESCRIPTION OF THE SPECIFIC EMBODIMENTS

Figure 1A:
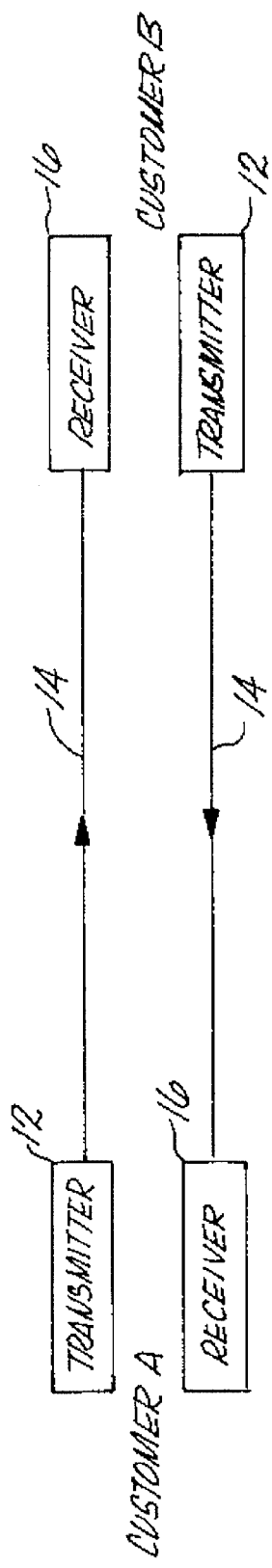
FIG. 1A is a block diagram showing a prior art digital carrier service.
Figure 1B:
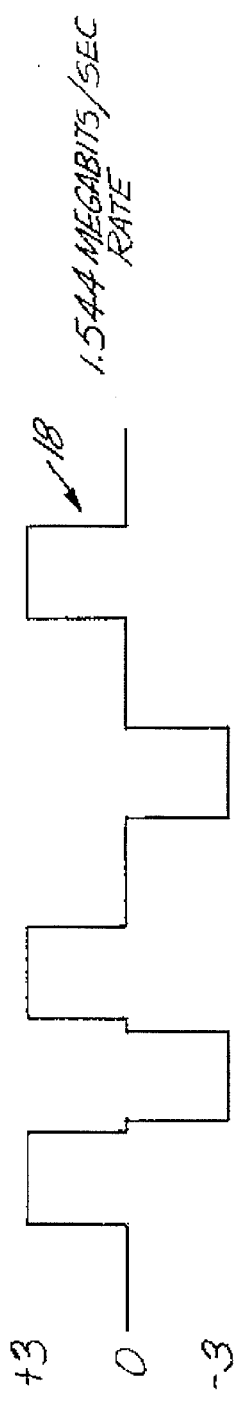
FIG. 1B shows a typical signal timeline for a digital carrier service.

Referring to the drawings, FIG. 1A shows a digital point-to-point carrier service. Customer A is on one end of the digital point-to-point carrier service and customer B is on the other end. Customer A has a transmitter 12 that transmits digital signals to receiver 16 via the copper twisted pair wires 14. Customer B also has a transmitter 12 that transmits digital signals on copper twisted pair wires 14 to receiver 16 of customer A. In this invention it is desired to switch the copper twisted pair wires 14 to fiber optic lines without interrupting the flow of data between customer A and customer B. FIG. 1B is a representation of a typical signal time line for a digital point-to-point signal. As shown the signal is bipolar and transitions from +3 volts to –3 volts. The signal 18 shown in FIG. 1B is switching at a 1.544 megabits per second rate.

In the prior art one technique of switching from one media to another is to take the digital point-to-point transmission service between customer A and customer B out of service and install the new lines, which results in a long service outage.

Another technique in the prior art is to attempt to simultaneously switch both a transmit end and a receive end of a line between one transmission media and another transmission media by manually pulling jacks on two different panels at the same time. If the jacks could be simultaneously pulled, then no interruption in service would occur. However, the distance between customer A and customer B is typically many miles which precludes the possibility of simultaneously pulling the jacks. Also manually pulling the jacks is inherently relatively slow. Thus, some down time is required during which time the jacks are pulled. Rather than pulling jacks on panels, switches can be installed with one switch installed at the transmit end and another switch installed at the receive end; however, downtime still results, because it is impossible to switch the switches simultaneously. If only one or the other switch is thrown then the service is interrupted until the other switch is thrown. Such a prior art switch device is the Throwmaster 109 made by Industrial Technology, Inc. of Mineral Wells, Tex.

In this invention apparatus and methods are described that solve the problems apparent in the prior art.

Figures 1, 2A:
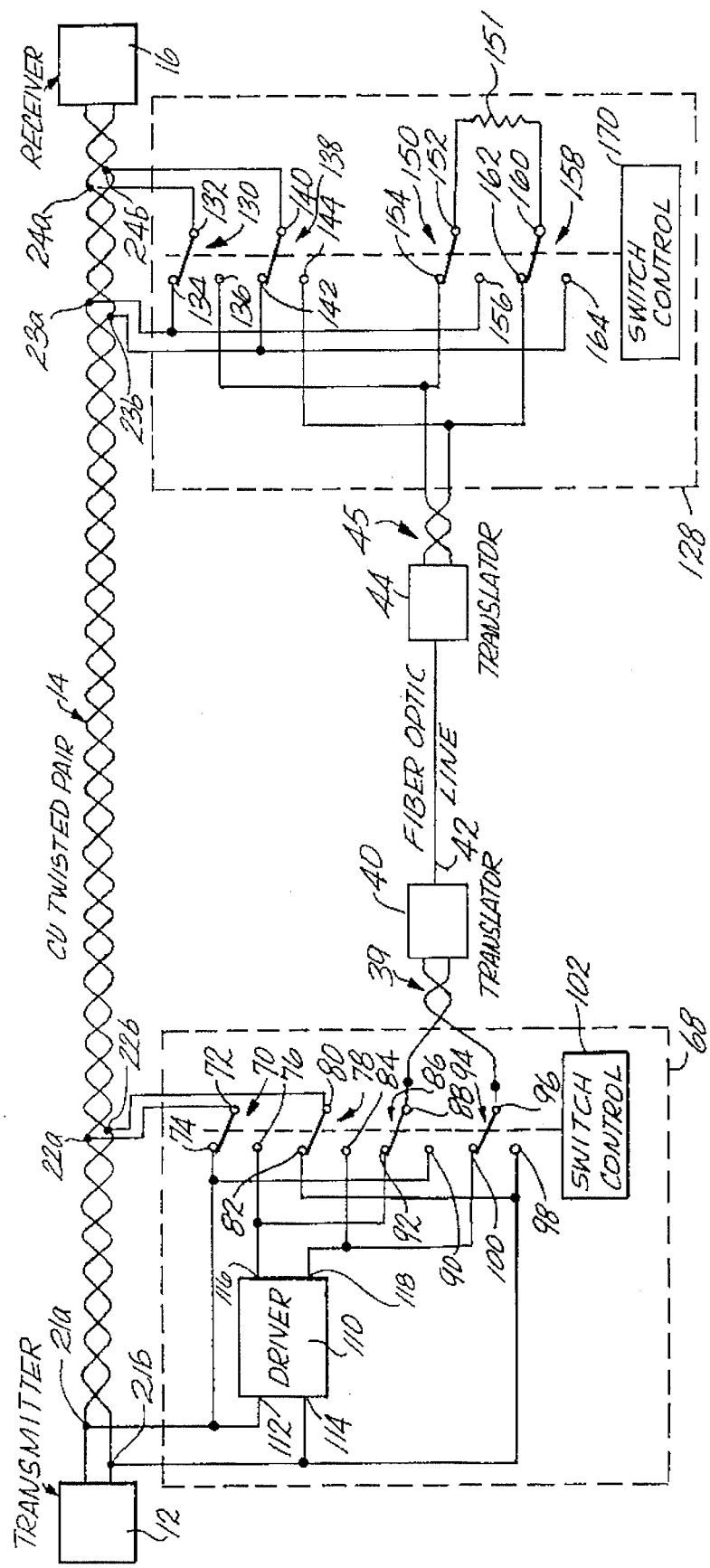
FIG. 2A is a block diagram of a digital carrier service with a partially installed cutover system according to the present invention.

FIG. 2A is a block diagram showing a digital point-to-point carrier service with a cutover system partially installed according to the present invention. The digital point-to-point carrier service includes transmitter 12 which sends signals to receiver 16 via copper twisted pair 14. It is understood that another transmitter/receiver pair is used to transmit data in the opposite direction. Cutover switch 68 is installed at the transmitter end of the transmission line. At the receiver end of the transmission line, cutover switch 128 is installed. Cutover switches 68 and 128 provide for the switching of the digital signals from the copper twisted pair 14 to the fiber optic line 42. At each end of the fiber optic line 42 are translators 40 and 44 which translate the light signals in the fiber optic line to electrical signals which are connected to the cutover switches 68 and 128.

When the cutover switch 68 is installed at the transmitter end of the transmission line, the cutover switch is tapped into the copper twisted pair at points 21a and 21b which provide an input to the cutover switch 68 and the output of the cutover switch 68 is tapped into copper twisted pair 14 at points 22a and 22b which are relatively close to points 21a and 21b. The cutover switch 68 also has an output to the copper twisted pair 39 which is coupled to translator 40 that drives fiber optic line 42.

Cutover switch 128 has an input from copper twisted pair 14 at points 23a and 23b. There is also an input to cutover switch 128 from the copper twisted pair 45, which is coupled to translator 44, which is in turn coupled to fiber optic line 42. The output of cutover switch 128 is tapped into the copper twisted pair at points 24a and 24b.

Cutover switch 68 has a driver 110 and switches 70, 78, 86 and 94. The driver 110 has an input impedance measured between inputs 112 and 114 that is quite high compared to the characteristic impedance of the copper twisted pair 14. For example, the input impedance of driver 110 can be as high as 10,000 to 20,000 ohms. The output of driver 110 measured across outputs 116 and 118 is designed to have an impedance that is approximately the same as the characteristic impedance of the copper twisted pair 14. A copper twisted pair typically has a characteristic impedance of 100 to 135 ohms.

Switch 70 has the purpose of coupling point 22a to either point 21a on copper twisted pair 14 or to the output 116 of driver 110. Similarly, switch 78 couples point 22b to either the point 21b or to the output 118 of driver 110. Switch 86 connects point 88 on copper twisted pair 39 to either point 21a or to output 116 on driver 110. Finally, switch 94 connects point 96 on copper twisted pair 39 to either point 21*b* or to output 118 of driver 110.

When the cutover switch 68 is first installed, the switches are set so that points 22*a* and 22*b* are coupled through switches 70 and 78 to points 21*a* and 21*b*, respectively, on copper twisted pair 14. Switches 86 and 94 are initially set so that points 88 and 96 of twisted pair 39 are initially coupled to the outputs 116 and 118, respectively, of driver 110.

At the receiving end, cutover switch 128, when it is initially installed, is set so that switches 130 and 138 connect points 23*a* and 23*b* on copper twisted pair 14 to points 24*a* and 24*b*, respectively, on copper twisted pair 14. Also initially switches 150 and 158 are set so that points 154 and 162, which are coupled to twisted pair 45, are coupled to termination resistor 151.

Thus, when cutover switches 68 and 128 are first installed, the path between transmitter 12 and receiver 16 on copper twisted pair 14 is undisturbed. In addition there is a parallel path of wires between points 21*a* and 22*a* and 21*b* and 22*b* through cutover switch 68 at the transmitter end, and at the receiver end there is a parallel path for the signal between points 23*a* and 24*a* and points 23*b* and 24*b*, through cutover switch 128. Although this path is in parallel with the copper twisted pair, the distance between points 21*a* and 22*a*, and 21*b* and 22*b* is short so that it is electrically transparent to the signals. This is similarly true for the distance between points 23*a* and 24*a* and 23*b* and 24*b*.

At the same time that the copper twisted pair is transmitting signals between transmitter 12 and receiver 16 in FIG. 2A, the signals are also transmitted via driver 110 from transmitter 12 through the fiber optic line 42 to the termination resistor 151.

FIG. 2A' is a block diagram showing an alternate configuration of cutover switches 68 and 128. The only difference between FIG. 2A and FIG. 2A' is that in FIG. 2A' the switches 171, 172, 173 and 174 are configured differently than switches 70, 78, 86 and 94. Similarly, in cutover switch 128, switches 175, 176, 177 and 178 are configured differently than switches 130, 138, 150 and 158. The switches 171, 172, 173 and 174 accomplish exactly the same function as the switches 70, 78, 86 and 94 and switches 175, 176, 177 and 178 accomplish exactly the same function as switches 130, 138, 150 and 158. The switches are just connected differently. For example, in FIG. 2A' the output 116 of driver 110 is connected via switch 171 to either point 22*a* or to point 88 on twisted pair 39. And switch 173 couples point 21*a* to either 22*a* or to point 88 on twisted pair 39. FIG. 2A' is shown to indicate that there are alternate ways to configure the switches inside the cutover switches 68 and 128. Having described an alternate switching mechanism in FIG. 2A', the remainder of the specification will refer to the switching configuration as shown in FIG. 2A.

The wires at points 180 and 182 as shown in FIG. 2B, must be cut before any cutover switches are switched; otherwise the signal quality will be degraded, because of improper terminations. Once the cutover switches 68 and 128 have been installed as shown in FIG. 2A, the next step in the process of switching from the copper twisted pair to the fiber optic line is to cut the twisted pair between points 21*a* and 22*a* and between points 21*b* and 22*b*. Also the copper twisted pair between points 23*a* and 24*a* and between points 23*b* and 24*b* is also cut as shown in cuts 180 and 182 of FIG. 2B. Note that after the copper twisted pairs have been cut as indicated, the signal is still transmitted from transmitter 12 to the receiver 16 via the copper twisted pair 14; however, the signal is now routed from the transmitter 12 through the cutover switch 68 and then through the copper twisted pair 14 and then through the cutover switch 128 and then to the receiver 16.

Figure 2C:
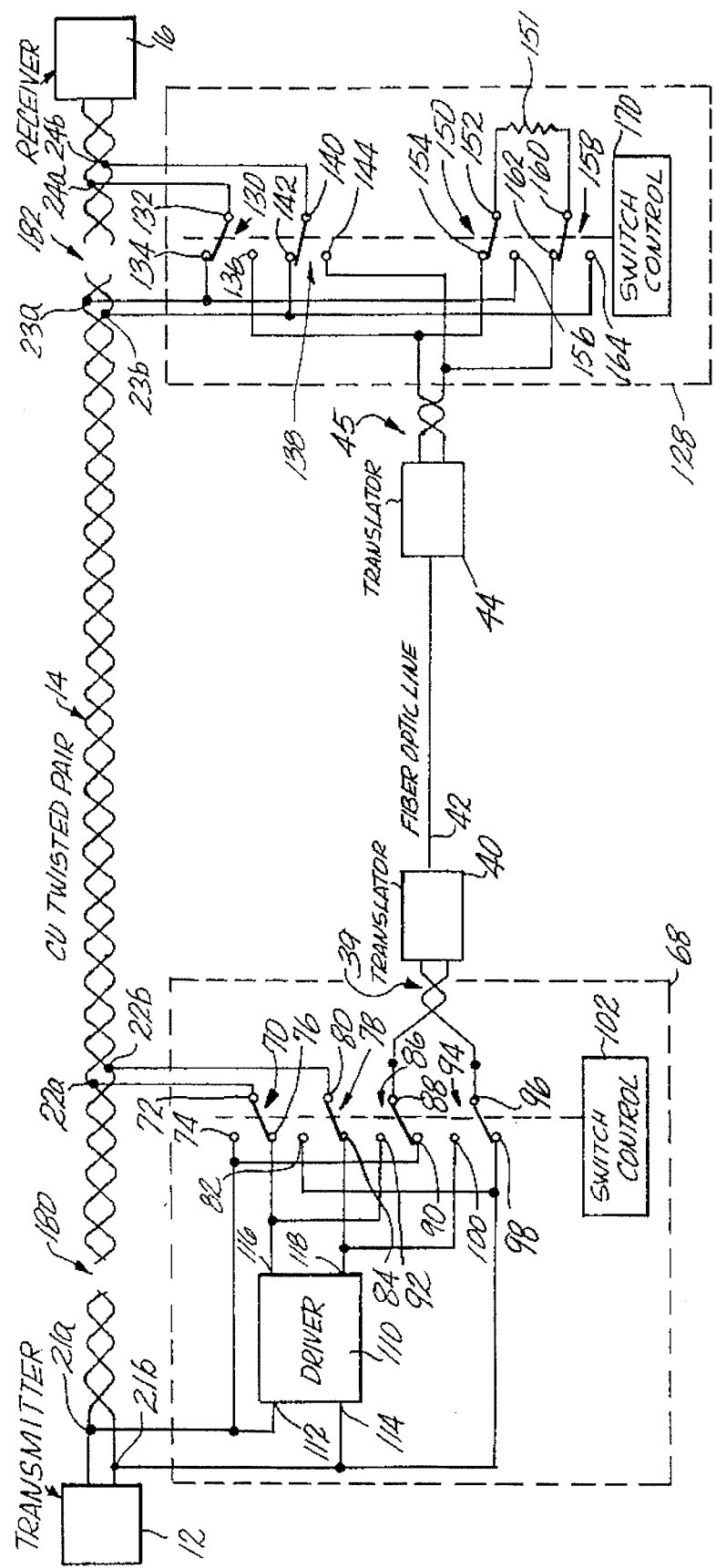
FIG. 2C is a block diagram showing an installed cutover system connecting the transmitter and the receiver via the driver and the copper twisted pair according to the present invention.

The next step in switching the signal transmission from the copper twisted pair 14 to the fiber optic line 42 is to operate switch control 102 to throw switches 70, 78, 86 and 94 so that the signal is sent through driver 110 and through the copper twisted pair to the receiver 16. As shown in FIG. 2C, switches 70 and 78 have been thrown so that point 22*a* is now connected to output 116 of driver 110 and similarly point 22*b* is connected to output 118 of driver 110. At the same time that switches 70 and 78 are thrown, switches 86 and 94 are thrown so that points 21*a* and 21*b* are connected to points 88 and 96, respectively, of twisted pair 39 which is coupled to translator 40 to drive the fiber optic line 42. At this point in the process as shown in FIG. 2C, cutover switch 128 has not been changed from the configuration shown in FIG. 2B. The driver 110 has an output impedance approximately the same as the copper twisted pair so electrically the receiver is unaware that the signal is being received via driver 110 rather than directly from transmitter 12 on twisted pair 14.

The next step in the process, as shown in FIG. 2D, is to operate switch control 170 to throw switches 130, 138, 150 and 158 so that the twisted pair 45 is coupled to receiver 16 and so that copper twisted pair 14 and points 23*a* and 23*b* are coupled to the termination resistor 151. The effect of this switching is to couple the transmitter to the receiver via the fiber optic line. At the same time the signal is still being driven through driver 110 and copper twisted pair 14 to termination resistor 151 which properly terminates the signal, as shown in FIG. 2D.

The next step in the process is to install bypass lines 190 and 192 between points 88 and 96 and 21*a* and 21*b*, respectively, as shown in FIG. 2E. Bypass lines are also coupled between points 24*a* and 24*b* and corresponding points on twisted pair 45, respectively. These bypass lines provide direct paths between the transmitter and the receiver via the fiber optic line 42. As shown in FIG. 2F, the final step is to remove the cutover switch 68 and the cutover switch 128.

With the described apparatus and method it is possible to switch the cutover switch 68 at one point in time and then at a later point in time switch cutover switch 128 without introducing any down time. During the interval of time between switching the cutover switch 68 and switching the cutover switch 128 no data is lost. A few bits might be lost during the switch transition between break and make, but these bits can be automatically recovered by using redundancy checking codes or the like during transmission. So with the apparatus and the method described here, it is possible to switch from one transmission media such as a copper twisted pair to another transmission media such as a fiber optic line without any significant loss in data.

Figure 2H:
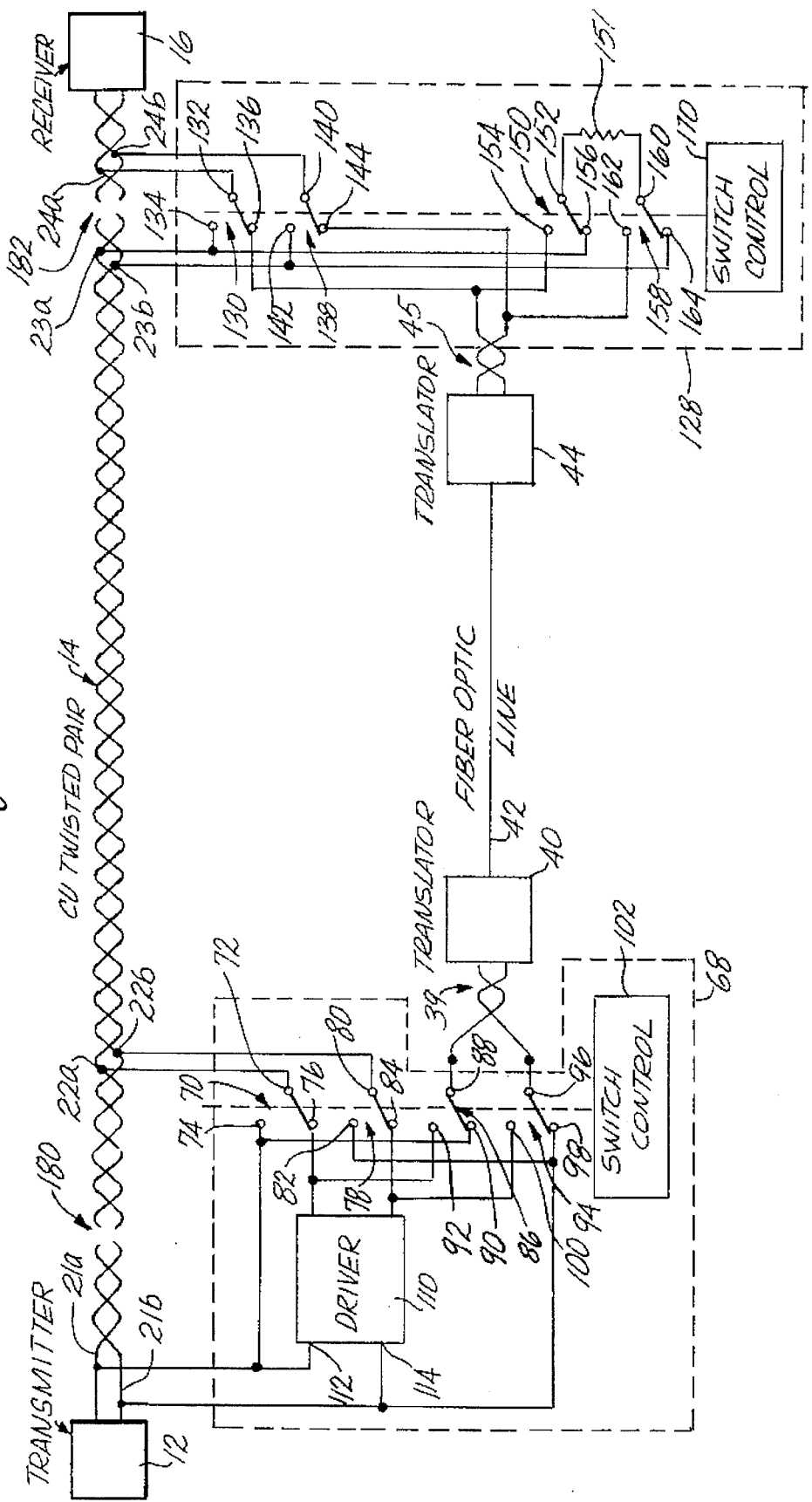
FIG. 2H is a block diagram showing an installed cutover system connecting the transmitter and the receiver via the fiber optic line according to the present invention.

In the description above, cutover switch 68 was switched before cutover switch 128. It is also possible with this apparatus and method to switch cutover switch 128 before switching the cutover switch 68. Suppose that the cutover switches have been installed as shown in FIG. 2A and that the cuts 180 and 182 have been made as shown in FIG. 2B. In FIG. 2G switch control 170 has been operated to switch the switches 130, 138, 150 and 158 so that copper twisted pair 45 is coupled to receiver 16 and so that copper twisted pair 14 and points 23*a* and 23*b* are coupled to termination resistor 151. With the switches as shown in FIG. 2G, the transmitter 12 is coupled to receiver 16 via driver 110 and fiber optic line 42. Then, as shown in FIG. 2H, switch control 102 can be operated to switch switches 70, 78, 86 and 94 in order to couple points 21a and 21b to twisted pair 39 and to couple the driver output to points 22a and 22b. Then the transmitter 12 is coupled to the receiver 16 via fiber optic line 42. Then bypasses, as shown in FIG. 2E, can be placed around the cutover switches and then as shown in FIG. 2F, the cutover switches can be removed.

Figure 3:
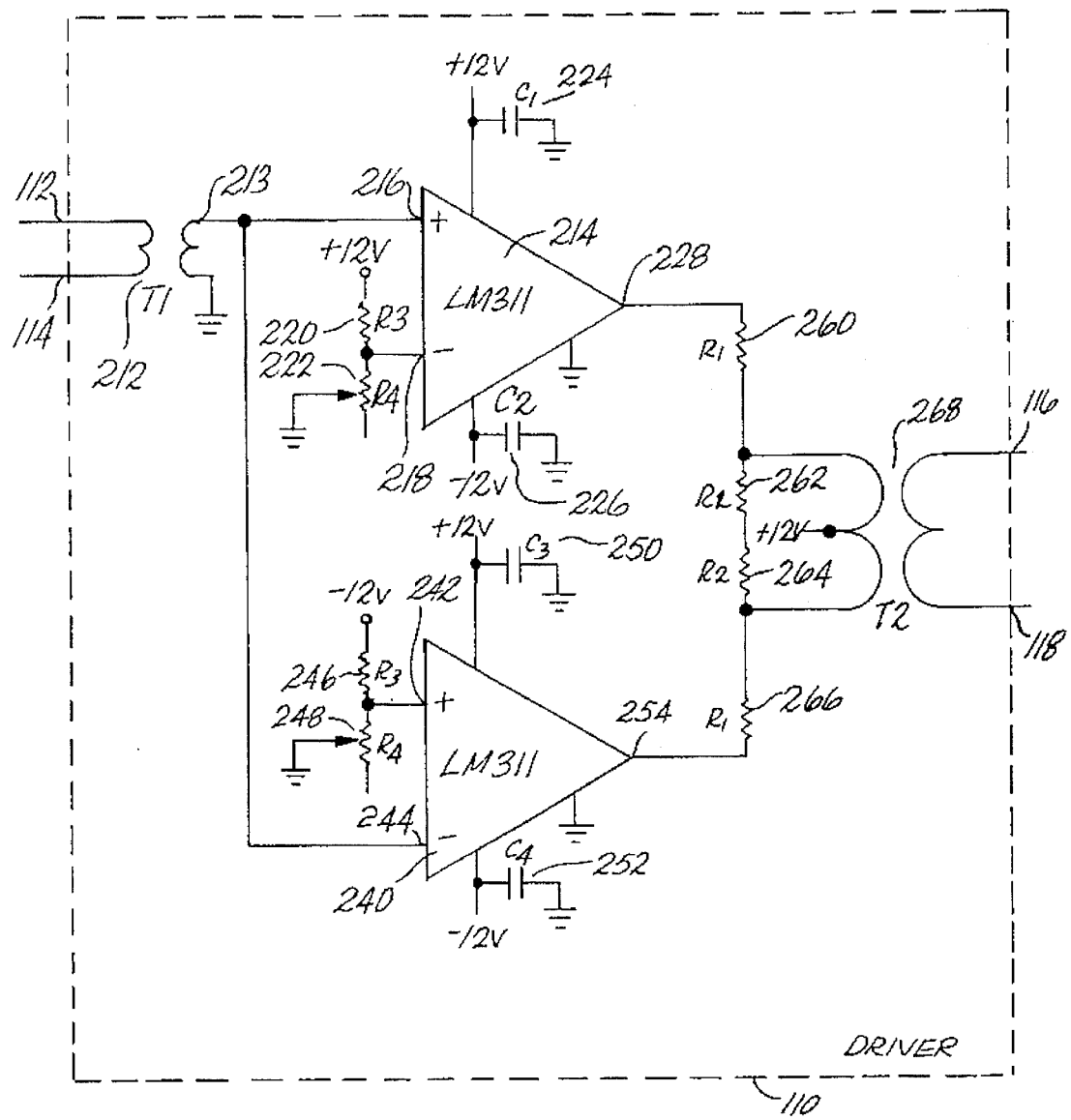
FIG. 3 is a circuit diagram of a driver according to the present invention.

FIG. 3 shows a circuit diagram of the driver according to the present invention. As shown the driver 110 consists of two voltage comparators 214 and 240 which receive a common input from transformer 212 which couples to the driver inputs 112 and 114. The outputs 228 and 254 of the voltage comparators are tied together through a resistor network consisting of resistors 260, 262, 264 and 266 which provide an output impedance which is approximately equal to the characteristic impedance of the copper twisted pair. The driver output is coupled to outputs 116 and 118 through transformer 268. Resistors 260 and 266 have a value of 91 ohms and resistors 262 and 264 have a value of 68 ohms.

The voltage comparators have open collector outputs. When triggered by a positive input, output 228 sinks the 12 volt center tapped primary of transformer 268 to ground through the resistor network, generating a +3 V pulse at the output 116, 118 of transformer 268. When triggered by a negative input, output 254 sinks the opposite end of transformer 268 to ground through the resistor network, generating a −3 V pulse at the output 116, 118 of transformer 268. The resistor network is designed to provide the proper characteristic impedance for the transmission line being used. A copper twisted pair typically has a characteristic impedance of 100 to 135 ohms.

While FIG. 3 is a preferred embodiment of driver 110, there are other circuits which can accomplish the same function and still be within the scope of this invention.

Thus, there has been described apparatus and methods for switching from one transmission media to a second transmission media.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A system for switching a signal from a first transmission media to a second transmission media, the apparatus comprising:

driver means for driving a signal, the driver means having a driver input having a high impedance relative to a characteristic impedance of the first transmission media and the driver means having a driver output having an impedance equal to the characteristic impedance of the first transmission media;

first switching means for coupling the driver output either to the first transmission media or to the second transmission media and for coupling a signal from the first transmission media coupled to the driver input either to the first transmission media or to the second transmission media; and first switch control means for controlling the first switching means for either simultaneously coupling the driver output to the first transmission media and the signal from the first transmission media coupled to the driver input to the second transmission media or simultaneously coupling the driver output to the second transmission media and the signal from the first transmission media coupled to the driver input to the first transmission media.

2. The system of claim 1 further comprising:

termination means having an impedance equal to the characteristic impedance of the first transmission media for terminating a signal from either the first or the second transmission media;

second switching means for coupling the first transmission media either to the first transmission media or to the termination means and for coupling the second transmission media either to the first transmission media or to the termination means; and second switch control means for controlling the second switching means for either simultaneously coupling the first transmission media to the first transmission media and the second transmission media to the termination means or simultaneously coupling the first transmission media to the termination means and the second transmission media to the first transmission media.

3. The system of claim 2 wherein the first transmission media comprises a copper twisted pair.

4. The system of claim 3 wherein the second transmission media comprises a fiber optic line.

5. The system of claim 2 wherein the signal is a bipolar digital signal.

6. The system of claim 5 wherein the driver means comprises:

first voltage comparator means for providing switching for a first polarity of the bipolar digital signal and having a first comparator input;

second voltage comparator means for providing switching for a second polarity of the bipolar digital signal and having a second comparator input coupled to the first comparator input for providing the driver input; and output resistor means coupled between an output of the first voltage comparator and an output of the second voltage comparator for providing a driver output having an impedance approximately equal to the characteristic impedance.

7. The system of claim 6 wherein the driver means further comprises:

first transformer means for coupling the first transmission media to the first and the second comparator input; and second transformer means for coupling the driver output to either the first or the second transmission media.

8. A method for switching a signal from a first transmission media having a characteristic impedance to a second transmission media, the method comprising the steps of:

coupling a driver input to a first position on the first transmission media, the driver input on a driver means for driving a signal and the driver input having a high impedance relative to the characteristic impedance of the first transmission media and the driver means having a driver output having an impedance equal to the characteristic impedance of the first transmission media;

coupling a first switching means to the first position on the first transmission media, to the driver output, to a second position on the first transmission, and to the second transmission media for coupling the driver output either to the second position on the first transmission media or to the second transmission media and for coupling the signal from the first position on the first transmission media either to the second position on the first transmission media or to the second transmission media; and controlling the first switching means to couple the signal from the first position on the first transmission media to the second position on the first transmission media and to couple the driver output to the second transmission media.

9. The method of claim 8 further comprising the steps of:

coupling a second switching means to a third position on the first transmission media, to the second transmission media, to a fourth position on the first transmission media, and to a termination means having an impedance equal to the characteristic impedance of the first transmission media, the second switching means coupling the third position on the first transmission media either to the fourth position on the first transmission media or to the termination means and the second switching means coupling the second transmission media either to the fourth position on the first transmission media or to the termination means; and controlling the second switching means to couple the third position on the first transmission media to the fourth position on the first transmission media and the second transmission media to the termination means.

10. The method of claim 9 further comprising the steps of:

removing a portion of the first transmission media between the first position on the first transmission media and the second position on the first transmission media; and removing a portion of the first transmission media between the third position on the first transmission media and the fourth position on the first transmission media.

11. The method of claim 10 further comprising the step of controlling the first switching means to couple the driver output to the second position on the first transmission media and to couple the signal from the first position on the first transmission media to the second transmission media.

12. The method of claim 11 further comprising the step of controlling the second switching means to couple the second transmission media to the fourth position on the first transmission media and the third position on the first transmission media to the termination means.

13. The method of claim 12 further comprising the steps of:

installing a first transmission line between the first position on the first transmission media and the second transmission media;

uncoupling the driver means from the first position on the first transmission media; and uncoupling the first switching means.

14. The method of claim 13 further comprising the steps of:

installing a second transmission line between the second transmission media and the fourth position on the first transmission media;

removing the termination means; and uncoupling the second switching means.

15. The method of claim 10 further comprising the step of controlling the second switching means to couple the second transmission media to the fourth position on the first transmission media and the third position on the first transmission media to the termination means.

16. The method of claim 15 further comprising the step of controlling the first switching means to couple the driver output to the second position on the first transmission media and to couple the signal from the first position on the first transmission media to the second transmission media.

17. The method of claim 16 further comprising the steps of:

installing a first transmission line between the second transmission media and the fourth position on the first transmission media;

removing the termination means; and uncoupling the second switching means.

18. The method of claim 17 further comprising the steps of:

installing a second transmission line between the first position on the first transmission media and the second transmission media;

uncoupling the driver means from the first position on the first transmission media; and uncoupling the first switching means.

19. A method for switching a signal from a first transmission media to a second transmission media, the method comprising the steps of:

coupling a driver input of a driver to a first position on the first transmission media, the driver input having a high impedance relative to a characteristic impedance of the first transmission media, and the driver having a driver output having an impedance equal to the characteristic impedance of the first transmission media;

coupling a first switch to the first position on the first transmission media, to the driver output, to a second position on the first transmission, and to the second transmission media, the first switch coupling the driver output either to the second position on the first transmission media or to the second transmission media and the first switch coupling the signal from the first position on the first transmission media either to the second position on the first transmission media or to the second transmission media; and controlling the first switch to couple the signal from the first position on the first transmission media to the second position on the first transmission media and to couple the driver output to the second transmission media.

20. The method of claim 19 further comprising the steps of:

coupling a second switch to a third position on the first transmission media, to the second transmission media, to a fourth position on the first transmission media, and to a termination means having an impedance equal to the characteristic impedance of the first transmission media, the switch coupling the third position on the first transmission media either to the fourth position on the first transmission media or to the termination means, and the switch coupling the second transmission media either to the fourth position on the first transmission media or to the termination means; and controlling the second switch to couple the third position on the first transmission media to the fourth position on the first transmission media and the second transmission media to the termination means.

21. The method of claim 20 further comprising the steps of:

removing a portion of the first transmission media between the first position on the first transmission media and the second position on the first transmission media; and removing a portion of the first transmission media between the third position on the first transmission media and the fourth position on the first transmission media.

22. The method of claim 21 further comprising the step of controlling the first switch to couple the driver output to the second position on the first transmission media and to couple the signal from the first position on the first transmission media to the second transmission media.

23. The method of claim 22 further comprising the step of controlling the second switch to couple the second transmission media to the fourth position on the first transmission media and the third position on the first transmission media to the termination means.

24. The method of claim 23 further comprising the steps of:

installing a first transmission line between the first position on the first transmission media and the second transmission media;

uncoupling the driver means from the first position on the first transmission media; and uncoupling the first switch.

25. The method of claim 24 further comprising the steps of:

installing a second transmission line between the second transmission media and the fourth position on the first transmission media;

removing the termination means; and removing the termination means; and uncoupling the second switch.

26. The method of claim 21 further comprising the step of controlling the second switch to couple the second transmission media to the fourth position on the first transmission media and the third position on the first transmission media to the termination means.

27. The method of claim 26 further comprising the step of controlling the first switch to couple the driver output to the second position on the first transmission media and to couple the signal from the first position on the first transmission media to the second transmission media.

28. The method of claim 27 further comprising the steps of:

installing a first transmission line between the second transmission media and the fourth position on the first transmission media;

removing the termination means; and uncoupling the second switch.

29. The method of claim 28 further comprising the steps of:

installing a second transmission line between the first position on the first transmission media and the second transmission media;

uncoupling the driver means from the first position on the first transmission media; and uncoupling the first switch.

* * * * *